United States Patent [19]

Küsters et al.

[11] 4,285,107

[45] Aug. 25, 1981

[54] COOLABLE ROLLER

[75] Inventors: Eduard Küsters, Gustav-Fünders-Weg 18, 4150 Krefeld, Fed. Rep. of Germany; Werner Hartmann, Krefeld, Fed. Rep. of Germany; Valentin Appenzeller, Kempen, Fed. Rep. of Germany

[73] Assignee: Eduard Küsters, Krefeld, Fed. Rep. of Germany

[21] Appl. No.: 932,188

[22] Filed: Aug. 9, 1978

[30] Foreign Application Priority Data

Dec. 20, 1977 [DE] Fed. Rep. of Germany ....... 2756745

[51] Int. Cl.³ .............................................. B21B 31/08
[52] U.S. Cl. ...................................... 29/129.5; 29/132
[58] Field of Search ..................... 29/129, 129.5, 132, 29/110; 226/190

[56] References Cited

U.S. PATENT DOCUMENTS

| 696,416 | 4/1902 | Denegre | 29/129 X |
| 2,280,125 | 4/1942 | Kauffeld | 29/129 |
| 3,365,774 | 1/1968 | Kusters | 29/132 X |

Primary Examiner—James Kee Chi
Attorney, Agent, or Firm—Kenyon & Kenyon

[57] ABSTRACT

In order to obtain better heat transfer in a coolable roller with an inner supporting cylinder which consists of metal, and on which a tubular roller jacket is firmly disposed, the jacket consisting of plastic and having slots on its inner circumference, the inner cylinder is constructed so that it can be cooled from the inside and a pressure resistant heat conductor which is in heat conducting contact with the walls of the slots is disposed in the slots.

5 Claims, 8 Drawing Figures

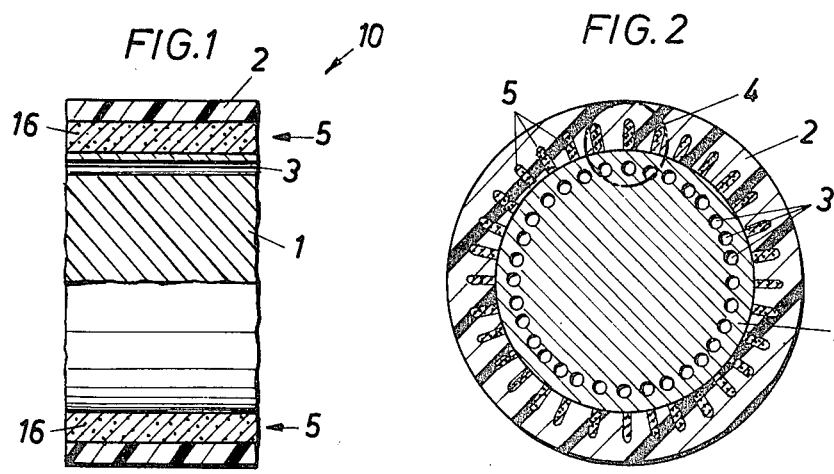
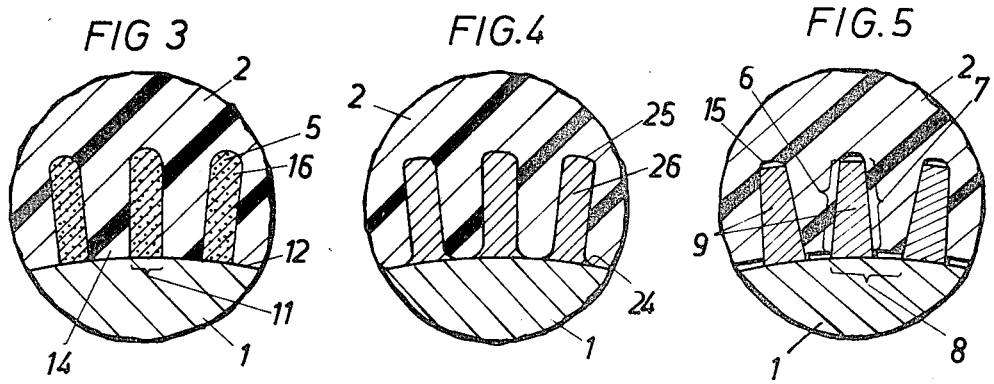
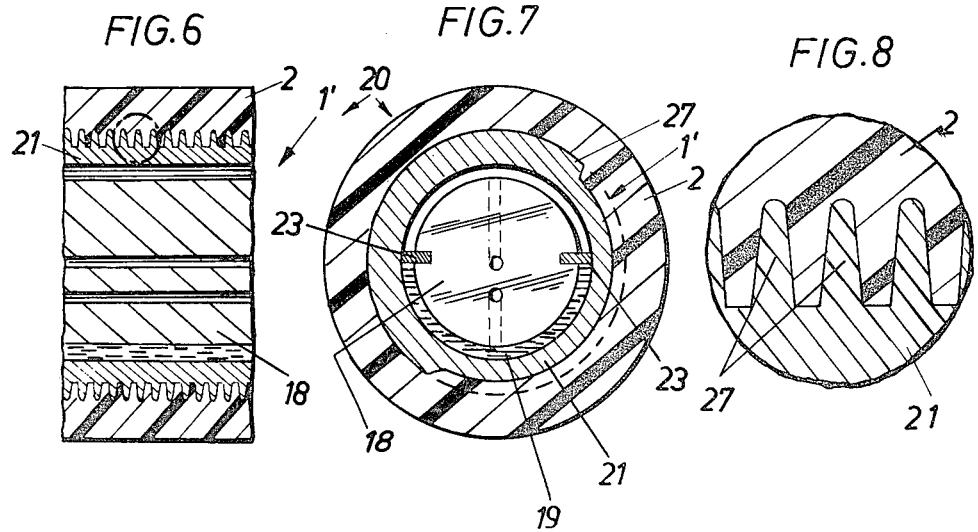

COOLABLE ROLLER

BACKGROUND OF THE INVENTION

This invention relates to coolable rollers in general and more particularly to an improved design of such a roller.

Coolable rollers with a supporting inner cylinder consisting of metal, on which is firmly disposed a tubular roller jacket, which consists of plastic and has slots as its inner circumference are described in German Petty Pat. No. 76 00 746. In the device disclosed therein, the inner cylinder has the form of a smooth cylinder and coolant ducts in the shape of slots are machined into the inside of the roller jacket facing the inner cylinder. The coolant is brought in through canals in the interior of the inner cylinder which lead to the coolant ducts provided in the roller jacket. The coolant ducts are arranged helically around the inner cylinder.

In the operation of a roller with a roller jacket of plastic, a characteristic temperature distribution adjusts itself. Under the usual operating conditions, the zone of highest temperature is not located on the outside or the inside of the roller jacket, but in the interior of the latter. For a temperature distribution which is brought about by the so-called "working energy" is superimposed on the temperature gradient determined by the temperatures on the outside and inside. In passing through the roll gap, the somewhat elastic plastic jacket is continuously subjected to deformation, as the result of which the plastic is heated up. Due to the deformation conditions, most of the working energy converted into heat per unit volume and time is now produced in the interior of the roll jacket. At the same time, the heat removal conditions for plastic are, of course, the worst in the interior of the roller jacket. This leads to a temperature distribution with a maximum in the interior of the roller jacket, which manifests itself in the fact that destruction due to overheating always occurs first in the interior of the roller jacket and not perhaps at its surface.

In the embodiment described in German Petty Pat. No. 76 00 746, the coolant canals, thus, should have dimensions such that the coolant can be brought very close to or into the zone of maximum temperature in the roller jacket. With a wall thickness of the roller jacket of 30 to 35 mm, the ducts should have a height of 5 to 15 mm, for example. The coolant ducts therefore must extend rather deep into the roller jacket in order to remove the heat from the zone where it is primarily generated. This is true particularly because of the fact that the thermal conductivity of plastics decreases with temperature, which makes the removal from the critical zones more difficult. Since the roller jacket may be subjected on its outside to high line pressures of up to 150 kg per cm of roller length and in isolated cases of up to 200 kg/cm, it is unevenly supported from the inside, i.e., by the lands remaining between the slots, for one, and next to that, practically not at all, as the cooling liquid flowing through the slots is at a low pressure which is just sufficient to move it through the slots. Increasing the pressure of the cooling water to an extent that would counteract the line pressure appreciably, however, is not possible because of the deformation of the elastic plastic roller jacket accompanying this and the leakage resulting therefrom.

The uneven support of the roller jacket from the inside in a zone which has particularly high temperatures and shows a tendency of plastic deformation, leads to markings on the surface of the roller by the canals under the line pressure. Such markings are extremely undesirable, of course, for any kind of processing, which is obvious, for instance, in the case of treating paper webs.

SUMMARY OF THE INVENTION

It is an object of the present invention to construct a roller of the above-mentioned type in such a manner that markings on the roller surface of slots serving as cooling ducts are eliminated.

According to the present invention, this problem is solved by providing that the inner cylinder can be cooled from the inside and by arranging a pressure resistant heat conductor which is in heat conducting contact with the inner cylinder in the slots.

In the inner cylinder, the arrangement of the canals can be made as is necessary for maximum cooling effect without having to consider, for the cooling ducts proper, problems of markings on the roller surface. The cooling ducts can be formed, for instance, by lengthwise drill holes, as is shown in the German Petty Pat. No. 19 33 831. Because of the high heat conductivity of the inner cylinder consisting of metal, temperature equalization automatically adjusts itself, in addition, over its surface, so that a rather uniform low temperature can be maintained there.

Now there is no longer any moving medium in the slots, as is the case with the cooling liquid of the known design, to absorb the heat from the slots and carry it away. Instead, a non-moving heat conductor is provided which absorbs the heat from the slot walls and passes it on to the surface of the inner cylinder. The heat transfer to the heat conductor is superior to that of a cooling liquid, since liquids that can be considered for this purpose are poor heat conductors.

Materials which have a heat conductivity comparable to metallic heat conductivity can be considered as heat conductors in the sense of the invention.

The term "pressure resistant" is understood to mean that the outline of the heat conductor fitted into the slot cross-section cannot be compressed by the forces which occur under the action of the line pressure. The heat conductor in the slots therefore braces the slot area against compression, so that the local lack of support from the rear, such as is the case with slots that are filled with cooling liquid of only low pressure, no longer exists. The markings caused thereby thus no longer occur. The slots can extend without difficulty up into the zone of preferred heat development of the roller jacket.

Metal arranged in the slots can be considered as the heat conductor. This can be realized in various ways.

In a first embodiment, the metal can be embodied by embedding a densified metal powder which fills the space formed between the slots and the surface of the inner cylinder.

The slots are open on the side facing the inner cylinder and are closed off by the inner cylinder. The cavity formed thereby is filled by the metal powder which, to insure good heat conduction, is not just poured in loosely, but is densified by a suitable method, so that good contact of the powder particles with each other is provided.

One method for manufacturing such a roller comprises fabricating the roller jacket separately from the inner cylinder and providing it with the slots; heating the roller jacket and cooling the inner cylinder; and, with the parts of the roller assembled in this condition, placing the metal powder in a cooled condition, in the slots and compacting it there.

The compacting can be accomplished by vibration and/or tamping, depending on what the spatial arrangement of the slots permits.

Since the roller jacket consisting of plastic expands much more than metal, it shrinks as it cools down; this not only secures it on the inner cylinder but also reduces the volume of the slots, which results in an additional compression of the metal powder beyond the amount of compacting that may have been achieved by vibration and/or tamping.

For instance, copper powder, bronze powder or aluminum powder, the latter being given preference for reasons of cost, can be considered as the metal powders.

The metal can also be provided in the form of a metal with a low melting point, which fills out the space formed by the slots and the surface of the inner cylinder.

The metal must have a melting point low enough that, when in the liquid condition, it does not destroy the roller jacket which consists of plastic. Considered can be, for instance, Wood's metal, tin or the like. The melting point should be high enough, on the other hand, that the metal is still solid at the temperature occurring at the slots during operation.

The metal can also be provided, however, by a metal section, the cross-section of which fits the cross-section of the slots. It is advantageous if the cross-section is trapezoidal. The base of the trapezoid rests on the inner cylinder. The flanks of the slots are in contact with the oblique sides of the trapezoid. The flank surfaces forming the heat transfer surfaces are pressed together particularly firmly by the loading of the roller due to a wedge effect, so that good heat transfer from the material of the roller jacket to the metal section is provided.

However, it is also possible to design the roller according to the present invention in such a manner that the metal serving as the heat conductor is provided by ribs on a correspondingly profiled surface of the inner cylinder.

The significance of this measure will become clear from the following. In manufacturing rollers of the type under discussion, there are basically two different possibilities, the application of which depends largely on the kind of plastic used. For one, the roller tube can be made separately and then fastened on the inner cylinder. This procedure is necessary, for instance, for rollers with a roller jacket of polyamide, which upon cooling and setting suffers so much polymerization shrinkage and is at the same time so brittle that a roller jacket which is to be produced on an inner cylinder by polymerization "in situ," cracks upon cooling and hardening. With such material, the roller jacket must therefore be allowed to shrink unrestrained and must therefore be made separately. The tube produced is turned to dimension and is then shrunk, after being warmed up, on an inner cylinder. The shrinkage stresses then occurring are still tolerable.

The other group is represented, for instance, by polyurethane, with which it is possible to apply a liquid reaction preparation which sets "in situ" and forms the roller jacket directly to the inner cylinder. The polyurethane is much less brittle and is more elastic than polyamide and shows no tendency to crack. Because of its advantages in processing as well as because of the treatment effects that can be obtained, polyurethane has become much more important than polyamide, particularly in the paper industry. But particularly in the case of polyurethane, effective cooling is important because care must be taken that the roller jacket does not exceed a temperature of about 70° C.

The first mentioned embodiments, in which the metal serving as the heat conductor in the slots is a separate element, would therefore be of interest, for instance, for polyamide rollers, while the last mentioned embodiment, in which the surface of the inner cylinder is profiled, could be realized, for instance, by a polyurethane roller, in which a liquid preparation is poured directly on the surface of the roller. The polyurethane adapts itself very accurately to the shape of the surface of the inner cylinder, which promotes the heat transfer.

The slots may be axial or also helical; a slot arrangement with a steep-pitch multiple thread is of special interest.

A slot form as steep as possible is advantageous particularly for filling in powder, since it promotes the settling of the powder under the action of gravity when vibrations are used, and also facilitates the compacting by means of thin rods introduced into the slots.

BRIEF DESCRIPTION OF THE DRAWINGS

FIG. 1 is a partial longitudinal section through a first embodiment of a roller according to the invention.

FIG. 2 is a cross-section of the embodiment of FIG. 1.

FIG. 3 is an enlarged presentation of the area 4 of FIG. 2.

FIGS. 4 and 5 are corresponding sectional views of other embodiments.

FIG. 6 is a partial longitudinal section of a further embodiment.

FIG. 7 is a corresponding cross-section of the embodiment of FIG. 6.

FIG. 8 is an enlarged view of the area circled in FIG. 6.

DETAILED DESCRIPTION OF THE INVENTION

FIG. 1 shows an embodiment of a roller 10 according to the present invention, which comprises an inner cylinder 1 made of solid steel and a roller jacket 2 consisting of polyamide. The roller jacket 2 is made separately as a tube by a centrifugal casting or a vertical casting process by block polymerization, is subsequently turned to dimension and then shrunk onto the inner cylinder 1.

The inner cylinder 1 has longitudinal holes 3 which are distributed over its circumference and through which a cooling liquid is passed, which liquid can be cooled down to very low temperatures, far below 0° C., in a suitable refrigerator. The inner cylinder can be subjected in this manner to very vigorous cooling, as the arrangement, number and cross-section of the longitudinal holes 3 can be chosen practically as desired. The heavily cooled inner cylinder 1 is to remove the heat occurring in the roller jacket 2, which consists of polyamide.

This heat removal prevents the roller jacket from reaching temperatures which would endanger the material and the treatment effect. These temperatures are produced, on the one hand, by the "working energy" in the material of the roller jacket 2 itself, and on the other hand, by the contact with the web of material where the roller jacket 2 forms a roll gap, for instance, with a counterroller heated to temperatures of 230° C. This is possible not only when the rollers make contact directly but also when the interposed web of material removes heat continuously. Nevertheless, the heating by the hot counterroller without special measures can lead to problems in a plastic roller jacket. It should now be possible to hold the temperature of the roller jacket 2, even under unfavorable circumstances, i.e., under high line pressures and operating speeds, and in contact with hot counterrollers, within a range which does not endanger the material of the roller jacket and which, in addition, gives the best treatment effect. This may be, for instance, a range of 60° to 80° C.

So that the heat in the roller jacket 2 can be now removed continuously and promptly, the roller jacket 2 is provided on its inside facing the inner cylinder 1 with profiling, which increases the area available for the heat transfer over an embodiment with a smooth cylindrical inside. The increase in the surface area comes about because slots 5 are cut into the inside of the roller jacket 2. In the embodiments of FIGS. 1 to 5, the slots are approximately axial. They have a rectangular cross-section and are rounded on the radially outward pointing side so that stresses due to the notch effect are avoided.

A metal powder 16 is disposed in the slots 5. It fills them out and may consist, for instance, of copper, bronze or aluminum. As can be been particularly from FIG. 3, the metal powder 16 absorbs heat from the surrounding plastic material of the roller jacket 2 via the entire boundary surface of the slots 5 and passes it on to the cooled inner cylinder 1, with which the metal powder is in heat conducting contact at the surface 11, which surface corresponds to the open side of the slot 5 which points toward the inner cylinder 1. The metal powder 16 in the slots 5 thus constitutes a type of cooling fins which are in heat conducting contact with the inner cylinder 1 and protrude into the material of the roller jacket 2.

The cross-sectional shape of the slots 5 shown in FIGS. 2 and 3 is only an example; other cross-sectional shapes can also be considered. Incidentally, the narrower the slots and the closer they are arranged together, the larger is the area available for the heat removal from the plastic. However, there is a practical limit, which will be approximately the design with the relative dimensions shown in FIGS. 2 and 3, as the heat which is brought out to the flanks via the land 14 is not enough, if the slots follow each other too closely and the land 14 remaining between the slots is too narrow, so that a finer slot arrangement beyond a certain limit is ineffective.

In the embodiment of FIGS. 1 to 3, the slots are approximately axial, so that the metal powder 16, with the roller standing up, can be filled in from one end and be compacted by means of vibration. Further compacting is accomplished by ordinary tamping by means of rods which fit the slot cross-section and are inserted from the end. During this operation, the inner cylinder 1 and the powder are kept in a very cold condition, while the roller jacket is warmed up. The shrinking of the roller jacket, which sets in when the temperature is equalized, leads to further densification of the compacted metal powder enclosed in the slots.

The slots 25 in the embodiment of FIG. 4 are of approximately rectangular cross-section but are flared out at 24 toward the surface of the inner cylinder 1, so that a heat transfer area as large as possible is available. The slots 25 are filled with Wood's metal, which had been filled in in liquid form during the assembly of the roller and solidifies in the slots 25. The melting temperature of Wood's metal should be above the temperature occurring at the location of the slots 25 during normal operation, so that the Wood's metal remains solidified. On the other hand, it should not be so high that the plastic is damaged by the melt as it is filled in.

The slots 25 of the embodiment of FIG. 4 may have a helical arrangement along the outer circumference of the inner cylinder, as the liquid Wood's metal can readily follow the shape of the slots when being poured in.

In the embodiment of FIG. 5, the slots 15 have an approximately trapezoidal cross-section with flanks 6 and 7. In the embodiment of FIG. 5, the area of the flanks 6 and 7 together is more than twice the area 8 which is normally available for transferring the heat from the roller jacket 2 to the cylinder 1.

In this embodiment, the heat conductor is realized by a wire-like metal profile 9, the cross-section of which is likewise approximately trapezoidal and fits the inside cross-section of the slots 15. The metal profile 9 is in contact with the cylindrical outer surface of the inner cylinder at the base of the trapezoid. Because of the pressure exerted by the shrunk-on roller jacket 2 and the wedge effect resulting from the inclination of the slot flanks 6, 7, the metal profile is jammed tight into the slot 5 and is also seated firmly on the other circumference 12 of the inner cylinder 1. In this manner, good heat transfer is provided at the surfaces mentioned.

One advantage of the embodiments shown above is that a comparatively slight displacement of the roller jacket 2 relative to the inner cylinder 1 is possible in the event of temperature changes, when the inner cylinder 1 and the roller jacket 2 expand at different rates, so that no excessive temperature stresses occur. This is especially important for polyamide rollers, since the material is brittle. In the temperature range of interest, displacements of several centimeters are possible in the longitudinal direction between the roller jacket and the inner cylinder.

The above-mentioned embodiments are, furthermore, provided mainly for cases where the roller jacket 2 is made separately and is subsequently placed on the inner cylinder 1.

In FIGS. 6 to 8, an important embodiment of a roller 20 is shown which is suitable particularly for polyurethane rollers, in which the roller jacket 2 is generated "in situ" on an inner cylinder by, for instance, pouring a liquid reaction preparation on the rotating inner cylinder. This embodiment differs from the previous embodiments in two respects.

The first difference relates to the design of the inner cylinder. The inner cylinder 1' is no longer designed as a solid steel cylinder with longitudinal drill holes 3 for conducting the cooling liquid as in FIGS. 1 and 2, but is a so-called "swimming roller" (Trademark of E. Küsters) which comprises a stationary core 18 as well as a hollow cylinder 21 which is arranged around the former at a distance and can be supported on the core 18 at the ends. Between the core 18 and the hollow cylinder 21, seals 23 arranged on opposite sides are provided. These are arranged in a slot in the core 18 and rest against the inside of the hollow cylinder 21. The seals 23 extend over the length of the core 18 and the hollow cylinder 21, respectively. At the ends, seals (not shown) are likewise provided, so that a pressure space 19 in the form of a semicylindrical longitudinal chamber is divided off between the core 18 and the hollow cylinder 21, into which pressure oil is fed via suitable feed lines, which exerts uniform pressure on the inside of the hollow cylinder 21 over its length.

The cooling of the inner cylinder 1' is accomplished in this embodiment by cooling the pressure liquid contained in the longitudinal chamber 19.

The second difference of this embodiment from the previous one is that the heat conductors which take the heat from the roller jacket 2 or its enlarged inner surface, are no longer separate elements as in FIGS. 3 to 5, but are designed as outer circumferential ribs 27 made in one piece with the hollow cylinder 21. These ribs 27 can be arranged helically around the inner cylinder 1' and have any desired pitch. They are cut into the outer circumference of the hollow cylinder 21.

The roller jacket 2 is polymerized "in situ" on the inner cylinder 1' by applying, for instance, a liquid plastic compound uniformly onto the rotating inner cylinder over its length and allowing it to set. This method is of interest particularly for polyurethane rollers, as this material withstands the occurring shrinkage stresses without difficulty.

Also, in the embodiment of FIGS. 6 to 8, the roller jacket 2 has slots on the inside, which are recessed from the roller jacket by the ribs 27 when the latter is poured. They may have different shapes. In the embodiment of FIG. 8, they have the shape of a small trapezoid.

In the method of generating the roller jacket 2 by pouring a plastic preparation on the inner cylinder 1', the ribs 27 need not be of one piece with the inner cylinder 1', of course. It is also possible to wind a corresponding metal profile on the inner cylinder 1' and then to perform the pouring of the roller jacket 2. It is also understood, finally, that a design of the inner cylinder as per FIGS. 1 and 2 can also be considered for polyurethane rollers with a cast-on roller jacket.

The slots 5, 15, 25 or the ribs 27 can extend in all embodiments up to the zone of maximum temperature rise, since they are filled with incompressible heat conductors which prevent the slots from being pushed in by the line pressure, and thus prevent markings on the surface of the roller.

What is claimed is:

1. A method for fabricating a coolable roller having an inner supporting cylinder which consists of metal on which a tubular roller jacket is firmly disposed, the roller jacket consisting of plastic and having slots on its inner circumference, the inner cylinder including means for cooling and a pressure resistant heat conductor which is in heat conducting contact with the walls of the slots being disposed in said slots comprising:
    (a) constructing the roller jacket separately from the inner cylinder, the roller jacket being constructed with slots;
    (b) heating the roller jacket and cooling the inner cylinder with the roller jacket disposed over the inner cylinder;
    (c) placing metal powder which is in a cooled condition into the slots;
    (d) densifying said metal powder; and
    (e) permitting the temperature of the jacket and inner cylinder to equalize.
2. The method according to claim 1 wherein said densifying is accomplished by vibrating said roller.
3. The method according to claim 1 wherein said densifying is accomplished by tamping said metal powder.
4. In a coolable roller with an inner supporting cylinder which consists of metal and on which a tubular roller jacket which consists of plastic and has slots on its inner circumference is firmly disposed, the improvement comprising means to cool the inner cylinder from the inside and a densified metal powder, filling out the space formed by the slots and the surface of the inner cylinder, disposed in said slots, forming a pressure resistant heat conductor which is in heat conducting contact with the walls of the slots.
5. In a coolable roller with an inner supporting cylinder which consists of metal and on which a tubular roller jacket which consists of plastic and has slots on its inner circumference is firmly disposed, the improvement comprising means to cool the inner cylinder from the inside and a metal with a low melting point filling out the space formed by the slots and the surface of the inner cylinder, disposed in said slots, forming a pressure resistant heat conductor which is in heat conducting contact with the walls of the slots.

* * * * *